United States Patent
Martin et al.

(10) Patent No.: US 10,087,092 B2
(45) Date of Patent: Oct. 2, 2018

(54) OZONE GENERATOR SYSTEMS, METHODS, AND APPARATUS

(71) Applicant: Custom Molded Products, LLC, Newnan, GA (US)

(72) Inventors: Frank G. Martin, Arroyo Grande, CA (US); Joseph A. Cannavino, Atascadero, CA (US)

(73) Assignee: Custom Molded Products, LLC, Newnan, GA (US)

( * ) Notice: Subject to any disclaimer, the term of this patent is extended or adjusted under 35 U.S.C. 154(b) by 0 days.

(21) Appl. No.: 15/911,474

(22) Filed: Mar. 5, 2018

(65) Prior Publication Data
US 2018/0194649 A1 Jul. 12, 2018

Related U.S. Application Data

(62) Division of application No. 14/752,579, filed on Jun. 26, 2015, which is a division of application No. 12/945,113, filed on Nov. 12, 2010, now Pat. No. 9,102,536.

(60) Provisional application No. 61/261,192, filed on Nov. 13, 2009.

(51) Int. Cl.
| | |
|---|---|
| *C02F 1/46* | (2006.01) |
| *C02F 1/467* | (2006.01) |
| *C01B 13/11* | (2006.01) |
| *C02F 1/78* | (2006.01) |
| *C02F 103/42* | (2006.01) |
| *C02F 1/00* | (2006.01) |

(52) U.S. Cl.
CPC ............ *C02F 1/4672* (2013.01); *C01B 13/11* (2013.01); *C02F 1/78* (2013.01); *C01B 2201/24* (2013.01); *C01B 2201/34* (2013.01); *C01B 2201/72* (2013.01); *C01B 2201/90* (2013.01); *C02F 1/001* (2013.01); *C02F 2103/42* (2013.01); *C02F 2201/46105* (2013.01); *C02F 2303/04* (2013.01); *Y10T 29/42* (2015.01); *Y10T 29/49124* (2015.01)

(58) Field of Classification Search
CPC . C01B 13/11; C01B 2201/12; C01B 2201/24; C01B 2201/34; C01B 2201/66; C01B 13/115; C02F 1/46; C25B 1/13; A61L 2/202
See application file for complete search history.

(56) References Cited

U.S. PATENT DOCUMENTS

| | | |
|---|---|---|
| 4,049,707 A | 9/1977 | Harter et al. |
| 4,690,570 A | 9/1987 | Wall |
| (Continued) | | |

FOREIGN PATENT DOCUMENTS

WO 9701507 A1 1/1997

OTHER PUBLICATIONS

PCT communication {Search Report) dated Jun. 19, 2012 in related U.S. Appl. No. 12/945,113.

*Primary Examiner* — Walter D. Griffin
*Assistant Examiner* — Cameron J Allen
(74) *Attorney, Agent, or Firm* — Laurence P. Colton; Smith Tempel Blaha LLC

(57) ABSTRACT

Corrosion Resistant Ozone Generators, including ozone generating chips, for various purposes including spas, pools and jetted tubs as well as methods for making and using such Corrosion Resistant Ozone Generators.

14 Claims, 11 Drawing Sheets

(56) References Cited

U.S. PATENT DOCUMENTS

| | | | |
|---|---|---|---|
| 4,892,713 A * | 1/1990 | Newman | C01B 13/11 422/186.04 |
| 5,354,541 A | 10/1994 | Sali et al. | |
| 5,435,978 A | 7/1995 | Yokomi | |
| 6,039,816 A * | 3/2000 | Morita | B08B 7/0071 134/19 |
| 6,129,850 A | 10/2000 | Martin et al. | |
| 6,284,203 B1 | 9/2001 | Tokutake et al. | |
| 6,331,279 B1 * | 12/2001 | Martin | C02F 1/78 210/760 |
| 6,500,332 B2 | 12/2002 | Martin et al. | |
| 6,726,885 B2 | 4/2004 | Borgstrom | |
| 6,730,277 B2 | 5/2004 | Lee et al. | |
| 6,833,121 B2 | 12/2004 | Cooper et al. | |
| 7,524,466 B2 | 4/2009 | Long | |
| 2002/0040876 A1 | 4/2002 | Martin et al. | |
| 2008/0292497 A1 | 11/2008 | Vangeneugden et al. | |

* cited by examiner

OZONE GENERATOR SYSTEMS, METHODS, AND APPARATUS

STATEMENT OF RELATED APPLICATIONS

This application is a division of U.S. patent application Ser. No. 14/752,579 having a filing date of 26 Jun. 2015, which is a division of U.S. patent application Ser. No. 12/945,113 having a filing date of 12 Nov. 2010, which claims priority on and the benefit of U.S. Provisional Patent Application No. 61/261,192 having a filing date of 13 Nov. 2009.

BACKGROUND OF THE INVENTION

Technical Field

The present invention relates to systems, apparatus, and methods of purifying and disinfecting waters used in various applications, including but not limited to spas, jetted tubs, Jacuzzis, whirlpools, wave pools, baths, ponds, water tanks, swimming pools and the like. More particularly, the invention relates to apparatus and methods specifically configured and adapted for the treatment, for example, for the purification, of waters used in spas, jetted tubs, Jacuzzis, whirlpools, wave pools, baths, ponds, water tanks, swimming pools and the like. In other embodiments, the invention may relate to systems, methods and apparatus for, without limitation, disinfecting foods (for example, by spraying and/or washing produce with a liquid containing a non-toxic disinfectant) and laundry and other household items (such as in purifying waters used in washing machines, dishwashers and the like for disinfection of clothing and other laundry.

The systems, apparatus, and methods of the present invention involve an ozone generator, in particular, a Corrosion Resistant Ozone Generator, for generating ozone from the oxygen contained in air or other oxygen-containing gasses. Such Corrosion Resistant Ozone Generators are suitable for a variety of purposes, for example in air freshening and for cleaning and disinfecting fluids such as aqueous fluids, particularly, although not exclusively, when the gas used as an oxygen source contains light amounts of nitrogen. Thus, such Corrosion Resistant Ozone Generators are adapted for use in the systems, apparatus and methods relating to circulating water purifiers such as a Jacuzzi-type tub or purifier, and in ozonized water generators, water purifiers and the like. The present invention also relates to a Corrosion Resistant Ozone Generator for generating ozone contained in air. The present invention thus relates to water purifiers equipped with an ozone generator for use with baths, swimming pools, Jacuzzis, ponds, water tanks and the like, for purifying water used in laundry and agricultural applications, and to Corrosion Resistant Ozone Generators for generating ozone contained in air.

Prior Art

Systems, apparatus and methods of treating and disinfecting water are of obvious and often critical importance. Access to safe water for drinking, cooking, bathing, and washing is obviously a basic human need. To ensure such safe water, drinking water and water used for industrial, agricultural, household or recreational use is often and advantageously purified. Thus, for example, spas, jetted (hot) tubs, whirlpools, wave pools baths, ponds, water tanks, swimming pools and the like are often treated with active compounds to maintain the water therein in a purified or sanitized condition. These active compounds, such as chlorine and ozone, have been used to sanitize the relatively large volumes, for example, hundreds or thousands of gallons, of water in such spas, tubs, etc. As used herein, the terms "spa" and "jetted tub" refer to systems which hold or contain a body of liquid aqueous medium, hereinafter referred to as water, which is often heated, in a reservoir which is smaller than a swimming pool, but is sufficiently large so that an adult human being can be completely submerged or immersed in the water contained in the reservoir. As used herein, Jacuzzis, baths, ponds, whirlpools, wave pools and swimming pools can be small or large, such that an adult human being, or several adult human beings can be completely submerged or immersed in the water contained in the reservoir.

Spas, jetted tubs and pools are often used by submerging all or a major portion of one's body in the water in the reservoir for recreation and/or relaxation. Additional, separate purifying or sanitizing components are also included in these waters to control bacteria, viruses, algae, etc., which are known to contaminate such waters. Very low concentrations of these active materials are used in order to avoid harming sensitive parts of the body—since such spas, tubs, pools etc. are sized so that the entire body can be immersed in the water and to minimize costs, because of the relatively large volume of water to be treated. For example, the normal (that is the typical, non-acute contamination) concentration of ozone used to purify or sanitize the water in a spa, tub or pool is often in the range of about 0.005 to about 0.05 parts per million (ppm) based on weight of ozone per volume of water (w/v).

Similarly, laundered fabrics are, by definition, soiled or dirty, and may also contain bacteria, virus particles, algae and fungi. Water used to launder clothing and other such fabrics is generally and advantageously treated before and/or after use, for example, to avoid recontamination of the fabrics or to lower the possibility of raising the infective load of such organisms in the environment.

Also, agricultural products, such as (without limitation) leafy produce (including lettuce, cabbage, parsley and the like), legumes (such as beans and peas), tomatoes, tubers (such as potatoes, beets, radishes and the like) all receive agricultural water, and various fertilizers. As a result of the use of certain sources of water or fertilizers there have been reports of bacterial and viral contamination of such foodstuffs. Disinfection of water for watering through the use of disinfecting agents (e.g., ozone and/or chlorine) can help lower the likelihood of food contamination. Ozone is an ideal agent for such disinfection, since it decomposes quickly into molecular diatomic oxygen, and leaves no aftertaste or residue on the food.

For similar reasons, treatment of, for example, drinking water with ozone provides water disinfection and purification without significantly affecting the taste of the water prior, for example to bottling.

Ozone ($O_3$) has conventionally been used in industrial as well as household applications for purifying and deodorizing air, other gasses and the like. Ozone is an allotrope of oxygen, and is a relatively high-energy molecule (and quite unstable) when compared to molecular diatomic oxygen $O_2$, and decomposes to molecular oxygen according to the equation $2O_3 \rightarrow 3\,O_2$ in about 0.5 hours under normal conditions at standard temperature and pressure (STP). Ozone is a powerful oxidizing agent and this ability contributes to its utility as a disinfectant.

Under natural conditions ozone is most plentiful in the atmosphere, in a region of the stratosphere called the ozone layer, located between about 6 and about 31 miles above the surface. Stratospheric ozone is produced from the interaction of ultraviolet rays with diatomic oxygen in the following reactions:

$$O_2 + photon \rightarrow 2O \quad (1)$$

$$O + O_2 \rightarrow O_3 \quad (2)$$

For most personal and industrial uses, ozone is generated using an ozone generator. The easiest and most cost effective manner of generating ozone is using the "coronal discharge method", in which high voltage is generated across a dielectric component located between two electrodes. A gap through which air or oxygen may be passed is also located between at least two electrodes. The spark generated across the dielectric component causes the formation of free radicals of oxygen, and subsequently the formation of ozone in a two-step reaction similar and corresponding to the formation of ozone from diatomic oxygen shown above.

Ozone generators are therefore generally known in the art. However, the generation of ozone creates certain problems particular to the process. Therefore, for example, high concentrations of ozone can be chronically corrosive to materials, such as (without exception) metals, alloys, and rubber. Further corrosion may be caused when air rather than pure oxygen is used as the source of diatomic molecular oxygen and nitrogen containing salts and acids can be formed. All of this material can thereby shorten the useful life of an ozone generator and other related equipment, conduits, hoses, housings, contacts, fittings, pipes, wires and the like located in close proximity to the ozone generator.

In response to this problem, Harter et al., U.S. Pat. No. 4,049,707 constructed an ozone generator comprising a first electrode, a composite dielectric structure containing at least one layer of a first dielectric material including overlapping, flat, plate like particles of an inert dielectric material located directly against a second electrode. The first electrode and composite dielectrics structure are separated so as to define the gap. The gap comprises a chamber in which air or oxygen may be permitted to flow, and in which ozone may be generated from the air or oxygen. Additionally, the surfaces of the first electrode and of the dielectric structure exposed to the gap are coated with a material that protects the interior surfaces of the gap. Harter discusses an ozone generation having at least two different dielectrics, one comprised of plate-like particles and in which the ozonation chamber is coated with titanium dioxide.

As indicated above, in addition to the corrosive effect of ozone itself, when ozone is generated using air, which contains about 70% nitrogen, nitric acid is formed particularly when the air is moist or humid. This nitric acid also shortens the life of the entire ozone generator system. Similarly, under certain conditions ammonium nitrate may form on the dielectric, electrode(s) or other parts of the ozone generator.

In Lee et al., U.S. Pat. No. 6,730,277, an ozone generator is disclosed which is reported to be capable of producing ozone with much less consumption of electric power than previous models. The ozone generator features a pulse generator for generating high voltage pulses and a discharge chamber for inducing electrical discharge in response to the high voltage pulses. Electrical discharge takes place between electrode plate and a grounded chamber wall; a sheet of oxide dielectric covers the chamber wall to prevent corrosion of the chamber wall.

In Borgstrom et al., U.S. Pat. No. 6,726,885, an apparatus and method for generating ozone is disclosed in which a generally symmetrical device comprises a first electrode arranged along a longitudinal axis. The electrode is proximal to a first dielectric component on a top side, and a second dielectric component on a bottom side. A top coronal discharge chamber and a bottom coronal discharge chamber are arranged between the first dielectric and a top second electrode and the second dielectric and a bottom second electrode.

Sali et al., U.S. Pat. No. 5,354,541, discloses an ozone generator comprising a helical spring anode within a sealed glass dielectric tube. And a metal tube cathode spaced across an annular gap from the glass tube.

Mechtersheimer, U.S. Pat. No. 4,960,570, discloses an ozone generator in the form of a pair of outer electrodes and a tube or layer of tubes having a diameter corresponding to the space between outer electrodes, and having in each case an inner electrode. This configuration is stated to have the advantage of dispersing heat rather quickly.

Arlemark, WO97/01507, is said to have the advantage of being produced in a high frequency alternating current with high voltage over a dielectric. Oxygen is introduced between two plates of aluminum oxide and a current is applied to an electrode net in the device.

Yomomi, U.S. Pat. No. 5,435,978, is directed to a plate like ozone generator comprising a plurality of discharging cells stacked one over the other under pressure in a pressure vessel.

Morita et al., U.S. Pat. No. 6,039,816, discloses a compact ozone generator comprising three layers of a dielectric, in which the first layer has a filamentous electrode attached to the top surface, the middle layer has an induction electrode on the surface thereof and the third layer has a heating coil located on the top surface thereof. The heating coil is for evaporating ammonium nitrate that may adhere to the discharge unit when humid air is used as the oxygen supply. The three layers are sandwiched together.

Ozone mixed with oxygen or air can be produced by passing oxygen gas (O2), for example, from a gas cylinder or an oxygen-containing gas, such as atmospheric air or air from an air blower, by the high voltage "coronal" discharge method. Large-sized ozone generators for industrial use generally employ pure oxygen or dry air as a starting material, whereas small-sized ozone generators for household or personal use employ untreated air as a starting material. Such air-using ozone generators have the disadvantage, as discussed above, that when the ozone generator is discharged continuously, corrosive or contaminating nitrogenous compounds such as ammonium nitrate or nitric acid may form or be deposited on the electrodes or other portions of the ozone generator as a result of their reaction with nitrogen in air, resulting in corrosion or otherwise interfering with the function of the device. More particularly, because untreated air often has a humidity percentage higher than that of artificially-produced dry air, large amounts of nitrogen oxides can be produced when ozone is generated by discharge.

Accordingly, when so corroded or contaminated, the density of the electric field generated by the ozone generator can be reduced. Also, salts such as ammonium nitrate covering the filamentary discharge electrode may tend to absorb water present in the air and become electrically conductive, thus increasing the apparent area of one or more electrode.

That is, in a conventional ozone generator, because salts and corrosive materials such as nitric acid may corrode or cover the electrode(s) of the ozone generator, the density of the electric field generated by the filamentary discharge electrode is reduced. The capacitance of the dielectric increases, resulting in reduced ozone generation.

Conventionally, therefore, the conventional ozone generator is periodically disassembled, and adhering ammonium nitrate is wiped off from the filamentary discharge electrode using water or a solvent. That is, a conventional ozone generator must be maintained through manual labor. After cleaning, the ozone generator resumes discharging to thereby generate ozone.

Typically, also, ozone is generated on site for use in, for example, applications including the purifying spa/tub/pool waters. Although ozone generators used for such service can, in addition to those employing coronal discharge, include apparatus containing a sealed ultraviolet (UV) light lamp. Such conventional ozone generators are generally effective, in that they will produce ozone for oxygen-containing gasses. However, these generators do have certain drawbacks that other ozone generators disclosed elsewhere herein do not have. For example, the UV light lamp is relatively bulky, can burn out (often requiring system disassembly and lamp replacement) and systems containing such lamps are relatively inefficient in producing the desired amounts of ozone.

Therefore, it would be advantageous to provide new ozone generators that address these problems, and systems for purifying waters used for example (and without limitation), in agriculture, food and drinking water applications, for household applications such as laundry (e.g., washing machine) and dishwashing applications, spas, jetted tubs and pools comprising such ozone generators.

Each and every patent, patent publication and other publication cited in this patent application is hereby incorporated by reference herein individually and in its entirety.

BRIEF SUMMARY OF THE INVENTION

Systems, methods and apparatus of the present invention employ a Corrosion Resistant Ozone Generator. By a "Corrosion Resistant Ozone Generator" is meant an ozone generator that produces ozone using the coronal discharge method and in which the inside surfaces of the discharge chamber are entirely, or substantially entirely, made from a dielectric, and in which the electrodes are entirely outside of the discharge chamber. In preferred embodiments, the Corrosion Resistant Ozone Generator used in the present invention is a compact, "chip"-like structure made entirely from dielectric and insulating materials, with the exception of the electrodes.

Thus, in a first preferred embodiment the invention involves a Corrosion Resistant Ozone Generator that provides a very compact structure which has at least one, or at least two, or at least three, or all of the following characteristics: is easily and conveniently mounted for use in a spa/jetted tub application; requires relatively reduced amounts of maintenance due to an anti-corrosion form of construction; is cost effective to produce and use; and effectively and efficiently produces ozone in sufficient quantities to perform the desired spa/jetted tub purification/sanitation service.

In other embodiments, the present Applicants have invented new systems, apparatus, and methods for purifying the waters in spas, jetted tubs, Jacuzzis, whirlpools, wavepools, baths, ponds, water tanks, swimming pools and the like. The new systems employ ozone as a purifying/sanitizing component in a Corrosion Resistant Ozone Generator described herein.

As indicated above, the ozone is generated using a Corrosion Resistant Ozone Generator assembly which is resistant to compromise due to corrosion commonly seen in ozone generators used in pools, spas, and tubs. Preferably, such Corrosion Resistant Ozone Generators are manufactured to be durable, convenient, reliable, requires little or no maintenance and generates ozone efficiently, for example, more efficiently than a conventional UV light lamp ozone generator. Additionally, an advantage of certain embodiments of the Corrosion Resistant Ozone Generator of the present invention is that they are compact. Such an ozone generator is particularly effective in producing purifying amounts of ozone for spas, jetted tubs and pools used for recreation and/or relaxation. The systems and ozone generators of this invention effectively purify/sanitize water in these spas, jetted tubs and pools want is effectively purified/sanitized, with low cost and maintenance, as discussed elsewhere herein.

In one broad aspect, the present apparatus is used for purifying the water in a spa, jetted tub or pool, and comprises a Corrosion Resistant Ozone Generator assembly and a transfer assembly. The Corrosion Resistant Ozone Generator assembly is sized and adapted to purify the water in a spa, jetted tub or pool, and includes a new Corrosion Resistant Ozone Generator, as discussed in more detail elsewhere herein, which is adapted to produce ozone from air or other oxygen-containing gases using a voltage-generated coronal discharge. The transfer assembly cooperates with the ozone generator to pass oxygen to the Corrosion Resistant Ozone Generator, and thence ozone produced by the Corrosion Resistant Ozone Generator to the water in the spa, jetted tub or pool.

In a broad aspect, the present invention is drawn to ozone generators (Corrosion Resistant Ozone Generators) in which the gap or discharge chamber into which oxygen-containing gas (such as air) is fed is made entirely or substantially entirely of a dielectric material. In a particular preferred embodiment of the present invention, the dielectric material is a ceramic material, such as an alumina ceramic; particularly preferred is a ceramic having 90% or greater, or 92% or greater, or 94% or greater, or 95% or greater, or 96% or greater, or 97% or greater, or 98% or greater of alumina. Electrodes are placed on either side of the outside surface of the dielectric at a position preferably directly over the discharge chamber within the Corrosion Resistant Ozone Generator, and a high voltage is applied to form a coronal discharge within the discharge chamber, thereby first forming oxygen free radicals, and then ozone from the unreacted $O_2$. The discharge chamber, the inside surface of which is made entirely or substantially entirely from a dielectric, has an air or gas inlet for oxygen-containing gasses) and an outlet for ozone containing gases. The electrodes are connected via wiring to a high voltage transformer.

In certain embodiments of the present invention, the Corrosion Resistant Ozone Generator assembly is formed as part of a Corrosion Resistant Ozone Generator including a high-voltage-generating circuit element. The Corrosion Resistant Ozone Generator may be present in a "chip" or "ozone cell" form, and may be disposed within a housing having a cover attached so as to prevent ozone leakage from the housing.

In certain embodiments the present invention comprises a Corrosion Resistant Ozone Generator which is easy to maintain and has an enhanced useful life as compared to an ozone generator in which the discharge chamber is not made entirely or substantially entirely from a dielectric. Also, in certain important embodiments the ozone generator may be configured so as to provide ozone disinfection to a water or aqueous fluid system.

Furthermore, in certain embodiments of the present invention the Corrosion Resistant Ozone Generator is configured so as to provide ozone disinfection to a water system using a compact, inexpensive, and easily manufactured ozone generator that is resistant to corrosion, and in which the discharge chamber is made entirely or substantially entirely from a dielectric.

Thus, in one broad aspect, the present invention provides a Corrosion Resistant Ozone Generator having a discharge chamber, the interior surfaces of the discharge chamber being comprised entirely (or substantially entirely) of a dielectric material. In particularly preferred embodiments the entire material surrounding the discharge chamber is made from a dielectric material.

Dielectric materials are materials having very low conductivity. These can be gasses, liquids or solids. Dielectric materials may be comprised of ceramics (such as porcelain), glass, plastics (such a polyethylene and epoxides), industrial coatings such as parylene, hydrocarbon oils (such as mineral oil or electrical grade castor oil), silicone oils, mica, wood, the oxides of various metals, such as aluminum oxides, and powdered dielectrics such as alumina, zircon, aluminum silicate, magnesium aluminum silicate, aluminum nitride, beryllia, zirconium dioxide, titanium dioxide, magnesium silicate, tungsten carbide, and, preferably, barium titanate. These powdered dielectrics may in some cases be suitable for use in making ceramic dielectrics.

Particularly preferred in the present application are solid dielectric materials having a high degree of non-reactivity to ozone itself, as well as to nitric acid or other nitrogenous by-products of the ozonation process when air is used as the oxygen source, particularly when the air is humid. Additionally advantageous is that the dielectric materials used have a suitably high resistance to heat, and preferably comprise elements that have favorable heat dissipation characteristics. Such materials may include dielectric ceramics, such as alumina and zirconium- and titanium-based ceramics, epoxides, mica-containing materials, such as mica-embedded polymers, other corrosion resistant polymers and the like. Preferably the materials should be resistant to high voltage and electrical arcing.

It is particularly preferable that the dielectric material be substantially homogenous. Additionally, and independently, it is particularly preferable that the dielectric material used in the present invention be capable of being formed into substantially compact forms, such as plates, slabs, wafers, sheets and the like. Such materials may include, without limitation, ceramic and polymeric materials.

In a preferred embodiment of the present invention, the Corrosion Resistant Ozone Generator is structured from a plurality of wafers of a dielectric; preferably the dielectric comprises a ceramic, most preferably an alumina ceramic material. The wafers all may be comprised of the same dielectric, or two or more wafers may be comprised of different dielectrics.

For example, in one embodiment the Corrosion Resistant Ozone Generator may be comprised of three dielectric wafers sandwiched together, with conductant plates, tubing, cylinders or tape able to withstand high voltages and arcing and acting as electrodes and wires connecting the plates or cylinders etc. to each pole of a high voltage source. The three wafers may either be bonded together using a dielectric material, such as a thin film of epoxy resin or glue, or metal disposed directly on the cylinder or plate, or alternatively may be held together in a "bundle" without being glued or bonded, for example, by using the customized tee fittings described below and in detail in the Examples herein.

It will also be understood by those of skill in the art that the Corrosion Resistant Ozone Generator of the present invention need not be substantially planar in every embodiment. For example, in certain embodiments the Corrosion Resistant Ozone Generator may comprise, for example, a substantially cylindrical or tubular device having inner and outer cylindrical dielectric inserts of different diameters and a cylindrical dielectric spacer insert sized and structured to fit between the inner and outer cylindrical dielectric inserts, with suitable inner and outer electrodes, and one or more gas inlet and ozone outlet each containing a void coextensive with a common inner void chamber formed between the dielectrics, the void chamber being structured to provide for corona discharge between the dielectrics and the generation of ozone. Other configurations of the Corrosion Resistant Ozone Generator will immediately be apparent to the skilled engineer.

Thus, in one embodiment of the invention, the center wafer of the Corrosion Resistant Ozone Generator has a substantially central opening, with the top wafer having segment of a proximal side of the wafer cut away from it, and the bottom wafer having a segment of a distal side cut away from it. The cut away portion of both the top and bottom wafers are preferably identically shaped, so that the wafers are substantially superimposable. Indeed, in one embodiment the top and bottom wafers are identical, except that they are rotated along one axis such that the top surface on the top wafer is the bottom surface of the bottom wafer. Also, preferably the sides of the cut out section of the top and bottom wafers are substantially the same width as the central opening of the central wafer.

In one embodiment of the present invention, one of the tee fittings comprises a flat, elongated sleeve portion into which a proximal end of the sandwiched ceramic wafers will fit firmly, and a tube fitting portion, preferably barbed or in the form of a luer or other tube fitting, for the simple attachment of tubing or hosing, if desired, to draw air or oxygen into the ozone generator of the present invention. The void defined by the tube fitting portion of the tee fitting is continuous with the void defined by the flattened, elongated sleeve portion of the fitting.

A second, preferably identical tee fitting is used to hold a distal end of the sandwiched ceramic wafers together and to thereby direct ozone from the ozone generator to its desired application. Of course, in an alternate embodiment the tee attached to the distal portion may be used to draw air or gas, and the tee attached to the proximal end of the sandwich may be used to direct ozone to its desired application.

In one embodiment, the proximal end of the sandwiched ceramic wafers has a top wafer with a cut out portion, wherein the sandwiched wafers together define a continuous void wherein air or gas entering the tee fitting may be drawn through the cut out portion into the discharge chamber defined by the central opening of the middle wafer, and finally the ozonated air or gas may exit the ozone generator through the cut out portion of the bottom wafer and the connected tube fitting portion of the distal tee fitting. Those of skill in the art will immediately recognize that the bottom wafer, rather than the top wafer, can be used to draw air or gas into the central opening of the middle wafer, and the top wafer, rather than the bottom wafer, can be used to direct ozone from the middle wafer to the desired application.

The customized tee fittings, described above and in the Examples herein, are made from a moldable material that has high insulation properties, is preferably strong, relatively heat-resistant, and is substantially resistant to chemical degradation caused by the by-products of ozone formation. Any suitable material that provides these properties will function well in this embodiment of the Corrosion Resistant Ozone Generator of the present invention. Preferably the material comprises polyvinylidene fluoride (PVDF), sold under the trademark KYNAR®. This material has all the properties indicated above, and is a dielectric material. PVDF can be injected, molded and welded very effectively.

Additionally, preferably a bonding material having high thermal stability, insulating ability, and high resistance to chemical damage (such as a silicone cement) is used to seal the ceramic/fitting interfaces.

In other, presently less preferred, embodiments of the invention, the body of the ozone generator can be made in any number of wafers, fragments, or pieces. For example, if the dielectric material is suitable for injection molding, the discharge chamber contained within a single molded piece of a dielectric component can be fabricated having channels for the introduction of air and for the evacuation of ozone. Such an ozone generator may be used in conjunction with a fitting which, if in a shape different from that described for the preferred embodiment of the invention, can be specially fabricated from a dielectric material such as PVDF to be used for the ozone generator.

Similarly, the shape and size of the ozone generator may be made to suit any desired application. When used for applications such as spas, jetted tubs, and small pools or other bodies of water, a ozone generator "chip" substantially as described previously will be preferred, since its size and shape are compact and yet suitable for use in these applications. However, where the amount of ozone required to be generated is substantially greater than this, either a plurality of ozone generators can be used in series, in parallel, or as a combination of series or parallel may be used, or the size of the ozone generator, particularly of the discharge chamber, can be increased.

Fabricating the ozone generator in three wafers or pieces substantially as described above may be one of the most cost effective and simple ways to manufacture the ozone generator of the present invention, since the need for engineering of complex forms and a multiplicity of molds can be avoided in favor of relatively simple designs. Moreover, if generally non-flowable dielectric materials are used (such as ceramics, which usually have very favorable heat dissipation characteristics) the use of injection molding techniques may not be a practical manufacturing option, and simple or more material-appropriate manufacturing methods must be used.

Thus, in another embodiment the present invention is directed to a method of making an ozone generator comprising:

a. manufacturing a plurality of dielectric slabs (or wafers) having substantially similar overall depth, length and width dimensions, and having a first side and the second side, wherein the length and depth of said slabs is substantially greater than their width;

b. stacking together three of said slabs so that their sides meet; wherein a middle slab comprises a central void completely surrounded by dielectric material, wherein a top slab comprises a first groove or void at a first edge, and wherein a bottom slab comprises a in second groove or void at a second edge opposite said first edge, thereby creating when the slabs are stacked a single discharge chamber comprising a gas inlet and a gas outlet comprising:

i. said first groove or void of the top slab, which is coextensive with,
 ii. the central void of the middle slab, which is coextensive with,
 iii. the second groove or void of the bottom slab, and;

c. placing a first high-voltage electrode on the outside surface of the top slab, d. placing a second high-voltage electrode on the outside surface of the bottom slab;

e. providing means for directing an oxygen-containing gas through the gas inlet into the discharge chamber and f. providing means for directing an ozone-containing gas from the discharge chamber through the gas outlet.

In a particularly preferred embodiment, the last two steps of the method described above can be accomplished using the customized tee fitting described therein, or any other suitable fitting or combination of fittings having the ability to simultaneously seal the gas inlet and gas outlet and to direct gas into the inlet on one side of the sandwiched slabs, and to direct gas from the outlet on the opposite side of the sandwich slabs following coronal discharge and the generation of ozone from oxygen.

It will be apparent that in particular embodiments of the present invention the top and bottom slab used in the method described above may be identical; in such case each of the two sides of the slab are also identical, and the bottom slab can be rotated 180° as compared to the top slab before inserting the middle slab between the top and bottom slab. The two sides of the top and bottom slabs may be identical because this slab is a homogeneous or relatively homogeneous material in which the surface and inside portions of the slab are substantially identical. Alternatively, the two sides of the top and bottom slabs may be identical because the two sides of the slabs are coated with an identical material. In this embodiment, currently less preferred, the interior of the slab may be coated with a dielectric material on all exposed surfaces prior to assembly of the ozone generator.

One reason that this latter embodiment is less preferred is that it requires substantially greater care and more steps in the manufacture of an ozone generator than does the use of a homogeneous dielectric material for fabrication of the slabs.

Depending upon the nature of the dielectric material used for the slabs, the grooves and central opening of the slabs described above can be made by fabricating the slabs in molds that contain notches for the groove or void of the top and bottom slabs, and a separate mold comprising a central projection for fabricating the middle slab with a central void or opening.

Alternatively, the slabs used in the fabrication of the ozone generator of the present invention can be fabricated as identical wafers or slabs first, and then shaped using cutting tools such as diamond saws or grinders to form the notches or voids of the top and bottom slabs, and the central opening of the middle slab. Of course, an advantage of this method is that the manufacture and assembly of the slabs in two the basic ozone generator can easily be mechanized and assembled using robotic manufacturing equipment without the need for detailed quality-control procedures involving the intermediate steps of manufacture.

The electrodes used in the ozone generators of the present invention should be placed on opposite, preferably flat, sides of the assembled device, in each case substantially directly over the location of the discharge chamber. It is particularly effective to place the electrodes in a generally centrally located position with respect to the outline of the discharge chamber underneath. If the electrodes are thus positioned, the resulting coronal discharge when a high-voltage electrical source is connected to the electrodes will be more effective, thereby maximizing the amount of ozone that can be generated within the discharge chamber.

In certain embodiments of the invention, two or more Corrosion Resistant Ozone Generators in accordance with the present invention can be utilized together if larger volumes of water are to be treated, for example for larger pools, large laundry purposes, or agricultural applications. In one particularly useful embodiment, accordingly, two or more Corrosion Resistant Ozone Generator assemblies or two or more Corrosion Resistant Ozone Generators, may be "teamed" together in a serial or parallel or a combination of serial and parallel configuration to provide enhanced ozone production to applications in which the amount of ozone required to be produced is higher. Examples of such embodiments are provided in the Examples herein.

When two or more Corrosion Resistant Ozone Generators are used together as described above, the electrodes of each of the Corrosion Resistant Ozone Generators is connected to a voltage source. Such plural use of Corrosion Resistant Ozone Generators is generally effective to produce sufficient ozone to purify (sanitize) the water in a spa, jetted tub or pool. For example, a single Corrosion Resistant Ozone Generator may be effective to sanitize a spa, jetted tub or pool containing about 50 or about 200 to about 1000 or about 5000 gallons of water. In another example, about two to about five Corrosion Resistant Ozone Generators connected either serially or in parallel, or in a combination of serial and parallel configurations may be effective to sanitize about 10,000 to about 25,000 or about 50,000 gallons of water. In yet another example, about ten to about fifty ozone cells connected either serially or in parallel, or in a combination of serial and parallel configurations may be effective to sanitize about 50,000 to about 100,000 or about 500,000 or about 1,000,000 gallons of water.

In one particularly useful embodiment, the Corrosion Resistant Ozone Generator preferably is connected to an electrical transformer sized, adapted and located to control the voltage provided to the Corrosion Resistant Ozone Generator assembly. Often, the Corrosion Resistant Ozone Generator operates on conventional alternating current. For example, the transformer may be adapted to function by utilizing available AC electrical power of about 100 to about 130 volts. In another embodiment the line power utilized by the transformer is about 200 to about 250 volts.

Alternatively, in other embodiments a 12 volt or 5-12 volt D.C. system may be employed to supply electric power.

The output of the transformer, that is the voltage provided by the transformer and utilized in the Corrosion Resistant Ozone Generator to create the coronal discharge within the discharge chamber, may be from about 1000 volts to about 12,000 volts, preferably (though not necessarily) in the range 2000 volts to about 8,000 volts, or about 2500 volts to about 5000 volts, or about 3000 volts to about 4000 volts, or about 3000 volts to about 3500 volts. It will be understood that the voltage ranges indicated here are intended to, and do, specifically disclose any point or pair of points included between the maximum and minimum voltages indicated herein.

Preferably, the Corrosion Resistant Ozone Generator utilized in the present invention is effective to produce sufficient ozone to purify (sanitize) the water in a spa, jetted tub or pool containing about 50 or about 200 to about 1000 or about 5000 or about 25,000 or about 100,000 or about 500,000 or about 1,000,000 gallons of water. The concentration of ozone in the water in the spa, jetted tub or pool may generally be as noted elsewhere herein.

Any suitable transfer assembly may be utilized provided that it functions to cooperate with the ozone generator to pass oxygen-containing gas into the discharge chamber of the ozone generator and ozone produced by the ozone generator to the water in the spa, jetted tub or pool.

As one example, the transfer assembly preferably makes use of a water pump, water pipes, an eductor assembly and a transfer conduit. The eductor (or venturi) assembly has an inlet and an outlet. The transfer conduit is adapted to provide a passage for ozone-containing gases to be transferred from the ozone generator to the eductor assembly. The water pump is positioned to pump water from the spa, jetted tub or pool through water pipes into the flow of which is positioned the eductor assembly. Due to the Venturi effect created by water flow through the water lines in the eductor assembly created by the water pump, the eductor assembly creates a negative pressure within the transfer conduit at locations upstream of the eductor assembly. Thus, the passage of water through the water pipes causes ozone-containing gases from the Corrosion Resistant Ozone Generator to pass through the transfer conduit into and through the eductor assembly and into the water flow.

The water pump can be, and preferably is, the pre-existing spa/jetted tub/pool water pump, that is the pump used to circulate water in the spa/jetted tub/pool. In one useful embodiment, the eductor assembly is located in a bypass conduit of the water pipes having a constriction that increases water flow; a minor amount, that is less than about 50%, of the water being pumped by the water pump is passed through the bypass line.

The transfer assembly preferably includes water pipes which circulate water from and to the spa or jetted tub or pool, and a filter located upstream of the eductor assembly in fluid communication with the water pipes and adapted to remove solid or particulate matter from the water passing through the water transfer line. The transfer assembly preferably further includes a heater adapted to heat the water flowing through the water transfer line upstream of the eductor assembly; however this feature is not necessary to the function of the ozone generator or the disinfection of water in the jetted tub, spa or pool.

In one embodiment, the ozone transfer conduit is configured to reduce the probability of water passing from the eductor assembly to the ozone generator. This feature is designed to avoid detrimentally affecting the ozone generator. For example, the ozone transfer conduit may include a water trap. The ozone transfer conduit may include a loop (for example, a water trap loop), preferably located above the eductor assembly, to reduce the risk of water contacting the Corrosion Resistant Ozone Generator. The Corrosion Resistant Ozone Generator assembly housing preferably is located above the water level in the spa/jetted tub.

The ozone transfer conduit may include a check valve (such as a "one-way valve"), for example, of conventional design adapted to prevent fluid flow in the ozone transfer conduit toward the ozone generator.

Those of ordinary skill in the art can readily see that the Corrosion Resistant Ozone Generator system described herein in the context of a system for disinfecting water used in jetted tubs, spas and pools can be largely adapted wholesale, or with minor variations, to other applications, such as laundry applications and agricultural applications. As described above, the use of water flow to create a negative pressure in a Venturi can be utilized to introduce ozone into the flowing water, and can simultaneously be used to draw air or oxygen-containing gas into the Corrosion Resistant Ozone Generator. Alternatively, the systems may comprise fans or pumps to move or help move air, gas, or ozone through the Corrosion Resistant Ozone Generator and into the water. Washing machines can either be manufactured with such Venturis plumbed into the water transfer system, or the introduction of an ozone generator into such systems can be retrofitted. Also, the Corrosion Resistant Ozone Generator assembly, including the housing can usually be made to be compact enough to fit within the washing machine housing or a dishwasher housing. Similarly, for agricultural applications, the Corrosion Resistant Ozone Generator assembly can easily be placed near the water supply pump for washing or watering produce using the disclosure provided above as a guide.

Methods for purifying/sanitizing waters located in spas, jetted tubs and pools, in washing machines, dishwashers, and for agricultural purposes are included within the scope of the present invention. Preferably, these methods comprise employing the present apparatus to provide a purifying/sanitizing amount of ozone to the water used in any such application.

Any combination of two or more features described herein are included within the scope of the present invention provided that the features in each such combination are not mutually inconsistent. Furthermore the invention is not limited to any example described herein, but is defined solely by the claims.

These and other aspects and advantages of the present invention are disclosed in the following detailed description and claims.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION OF PREFERRED EMBODIMENTS

Aspects, features and advantages of several exemplary embodiments of the present invention will become better understood with regard to the following description in connection with the accompanying drawings. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Any aspect described herein as exemplary is not necessarily to be construed as exclusive, preferred or advantageous over other aspects.

EXAMPLE 1

Figure 1:
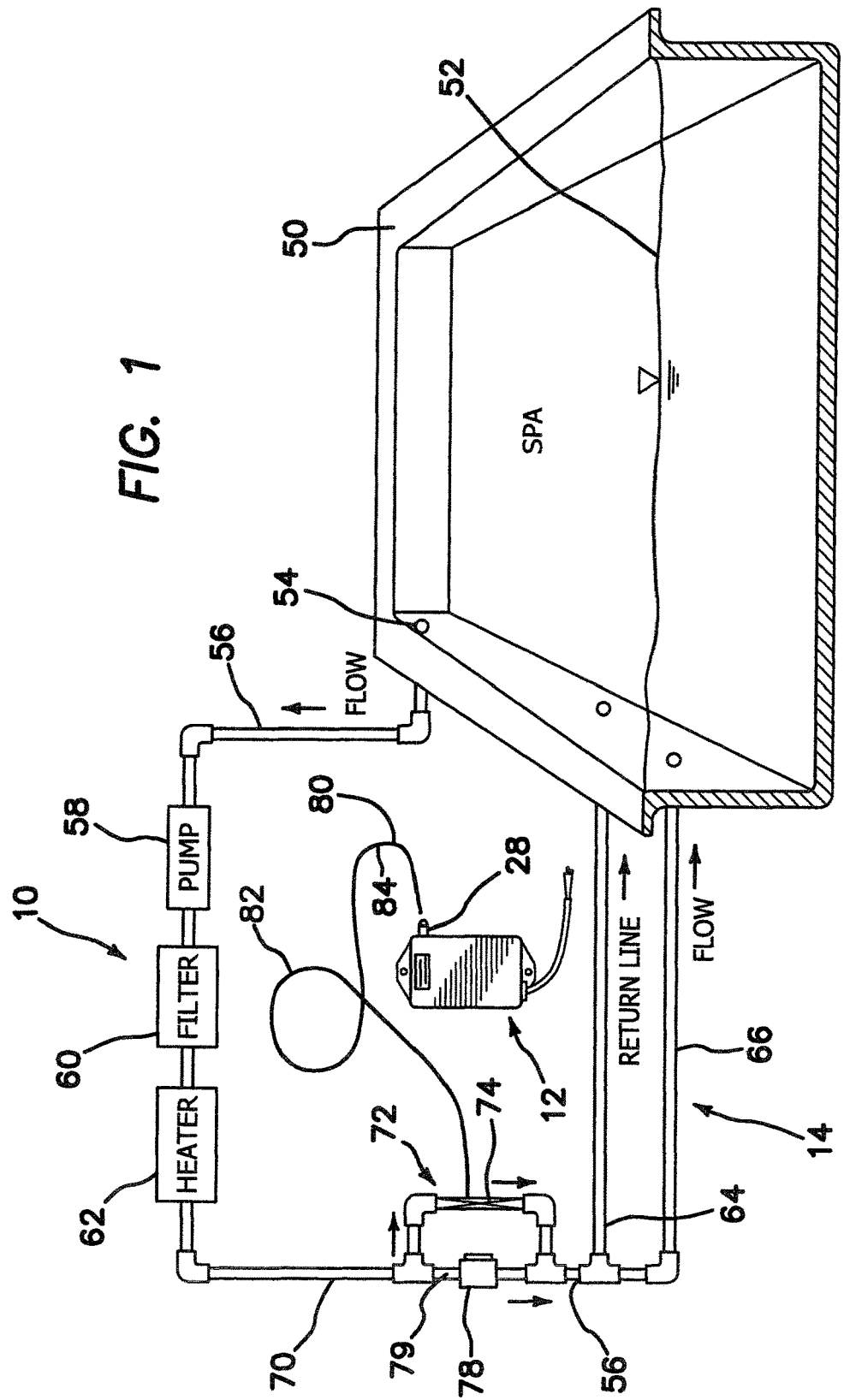
FIG. 1 is a generally schematic illustration showing an embodiment of the Corrosion Resistant Ozone Generator assembly housing in use in purifying the water in a spa.
Figure 2:
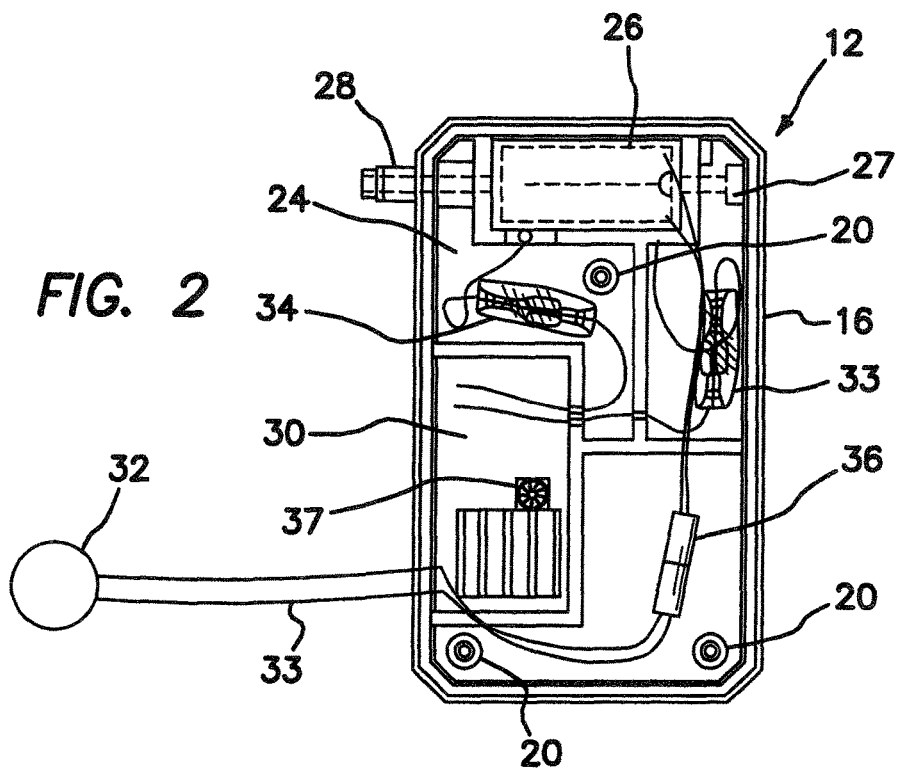
FIG. 2 is a planar view of the Corrosion Resistant Ozone Generator assembly housing used in the embodiment shown in FIG. 1 with the housing cover removed.
Figure 3:
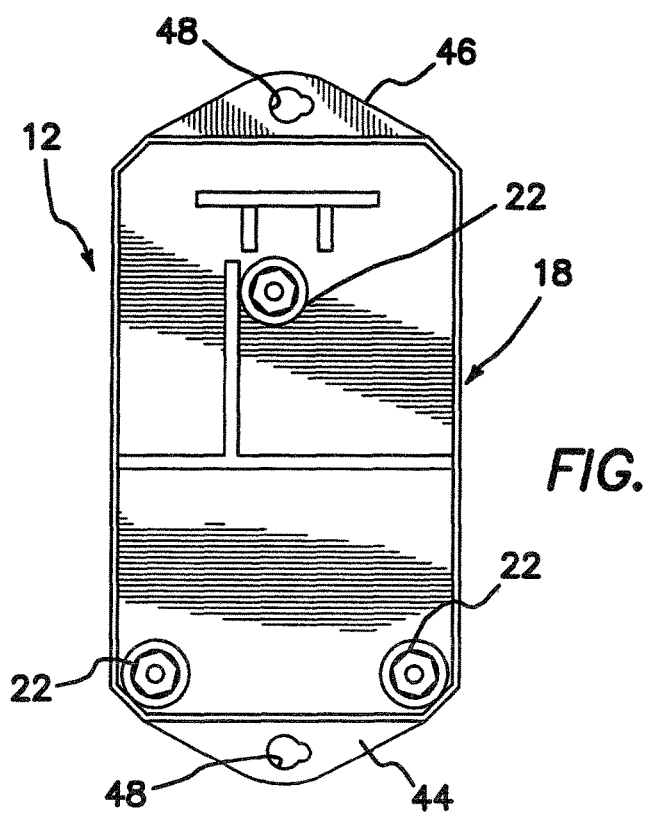
FIG. 3 is a planar view of the inner surface of the housing cover of the Corrosion Resistant Ozone Generator used in the embodiment shown in FIG. 1.

Referring now to FIGS. 1-3, one configuration of the system of the present invention, shown generally at 10, includes a Corrosion Resistant Ozone Generator assembly housing shown generally at 12, and a transfer assembly, shown generally at 14. The Corrosion Resistant Ozone Generator assembly housing 12 is surrounded by a housing body 16 and a housing cover 18 which is adapted to be joined or connected to the housing body by coupling threaded inserts 20 through complimentary cover holes.

With housing cover 18 secured to housing body 16, ozone generator 12 is contained within and protected by a compact, closed unit. Located within the space 24 between the housing body 16 and housing cover 18 is a Corrosion Resistant Ozone Generator 26. Ozone-containing gases produced by Corrosion Resistant Ozone Generator 26 from air entering housing body 16 through air inlet 27 exit the housing through housing outlet 28, which can be an integral part of the housing body 16. The air inlet may, and preferably does, include a particulate filter, for example, of conventional construction. The air inlet may provide for uptake of air from the atmosphere, uptake of air from an air blower or uptake of oxygen from an oxygen tank. Furthermore, the air inlet may comprise an air dryer, such a heater or an anhydrous material capable of removing water from the air drawn through it. Both the housing body 16 and housing cover 18 can be made from any suitable material or materials of construction. Preferably, these components are made of polymeric material. For spas, jetted tubs and small pools the Corrosion Resistant Ozone Generator housing 12 typically has a length in a range of about 4 inches to about 10 inches, a width in a range of about 1 inch to about 6 inches and a thickness of about 0.5 inch to about 4 inches.

An electrical transformer 30, of conventional design, is typically included within space 24. Electrical transformer 30 processes line power, e.g., 120V, from source 32 through power cord 33 and transforms this line power into power suitable for use by the Corrosion Resistant Ozone Generator 26. Transformer 30 is a "step up" transformer; in this embodiment of the invention Corrosion Resistant Ozone Generator 26 uses power having a voltage in the range of about 1000 to 12,000 volts, preferably about 3000 to about 5000 volts, more preferably in the range of about 3000 to about 3500 volts. A series of electrical connectors 33, 34 and 36 are optionally included within space 24 and are adapted to connect electric wires so as to provide electric power from source 32 and ultimately transfer the power to the Corrosion Resistant Ozone Generator 26. These connectors are adapted to be easily removed to allow maintenance of the system contained within housing 12. A variable potentiometer 37 is optionally provided and is used to control or adjust the ozone output of Corrosion Resistant Ozone Generator 26 within housing 12.

In addition, the housing cover 18 of this embodiment includes two end tabs 44 and 46, each of which includes a through hole 48 through which screws can be passed to secure the Corrosion Resistant Ozone Generator housing 12 in place in a suitable stationary position.

The present system comprising the Corrosion Resistant Ozone Generator 26 operates as shown in FIG. 1. Spa 50 includes a quantity of heated and circulating water 52, for example, about 500 to 1000 gallons in volume. The spa 50 is equipped with a water circulating system in which water from the spa passes through spa outlet 54 into conduit 56 through spa pump 58, spa filter 60 and spa heater 62. Eventually the pumped, filtered and heated water is passed back to the spa 50 through return lines 64 and 66.

In the present invention, piping segment 70 (a part of conduit 56), downstream of heater 62 is divided to provide a bypass line, shown generally at 72. Bypass line 72 includes a venturi assembly 74, of generally conventional construction, which acts as an ozone eductor to suction ozone-containing gases from the Corrosion Resistant Ozone Generator 26 in housing 12 into bypass line 72. The combined ozone-containing gases and water is returned to the main water conduit 56, as shown in FIG. 1. A valve 78, of conventional design, is located in water conduit 79 and can be adjusted to control the amount of water passed through bypass line 72. The ozone-containing gases from Corrosion Resistant Ozone Generator 26 are passed through housing outlet 28 and through ozone conduit 80 into the water flowing through bypass line 72. The suction created by venturi assembly 74 causes ozone to flow through ozone conduit 80.

Ozone conduit 80 includes a water trap loop 82 located above venturi assembly 74. This water trap loop 82 acts to protect the ozone generator from being exposed to water in line 56 and bypass line 72. In addition, ozone conduit 80 includes a one-way check valve 84, of conventional construction, which effectively prevents fluid from flowing in the ozone conduit back to the ozone generator 12. This feature inhibits, or even substantially prevents, any water from line 56 and bypass line 72 from entering ozone generator 12.

Another embodiment of the claimed system is shown in FIG. 1. Apparatus 10 functions as follows. When it is desired to purify/sanitize the water 52 in spa 50, operation of the pump 58 and Corrosion Resistant Ozone Generator 26 is initiated. This causes water 52 to flow from spa 50 through line 56 into pump 58, optional filter 60, and optional heater 62 into piping segment 70. At this point, a minor amount, that is, less than about 50%, of the total water passing through segment 70 is caused to flow through bypass line 72 and venturi assembly 74. This causes ozone-containing gases being generated by Corrosion Resistant Ozone Generator 26 to pass through ozone conduit 80 into the water in bypass line 72, which is ultimately returned to the spa via return line 64 and 66.

Sufficient ozone is produced in accordance with the present invention to purify/sanitize the water 52 in spa 50 and/or to maintain such water in the desired purified/sanitized state.

EXAMPLE 2

This example describes the components of one embodiment of the Corrosion Resistant Ozone Generator 26 which can be used in the system of the present claims.

Figure 4:
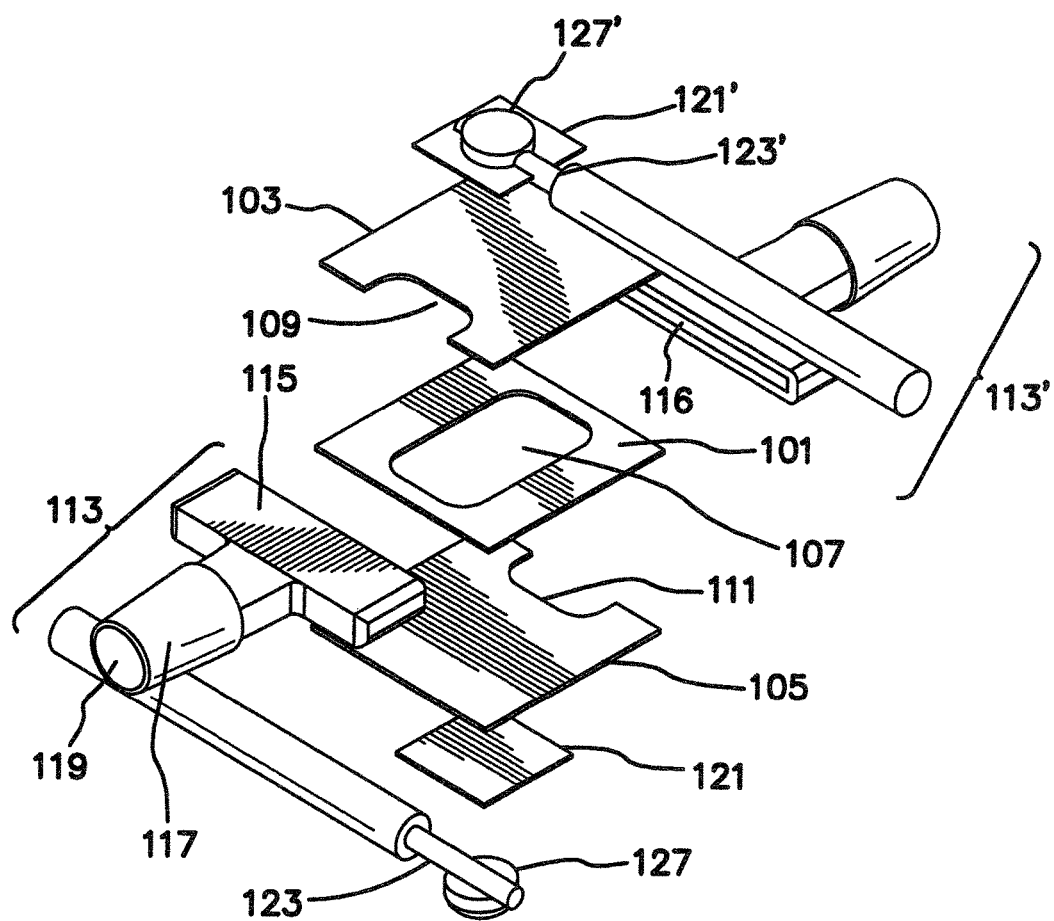
FIG. 4 is a top planar view of the components of the Corrosion Resistant Ozone Generator used in the embodiment in FIG. 1.

As shown in FIG. 4, the chip electrode assembly has a center wafer 101 made entirely of a dielectric; this wafer is a "spacer" wafer positioned between a top wafer 103 and a bottom wafer 105. In this embodiment the spacer wafer 101 is made of 96% alumina ceramic. The spacer wafer 101 has a substantially central opening 107. The top wafer 103, in this case also made of 96% alumina ceramic, has a segment of a proximal side of the wafer cut away from it 109, and the bottom wafer 105, made of 96% alumina ceramic, and having a segment of a distal side cut away from it 111.

Those of ordinary skill in the art will be aware that the spacer wafer, top wafer and bottom wafer may be comprised of other ceramic dielectrics or even other non-ceramic dielectrics; moreover, in other embodiments, one or more wafer may be comprised of a different dielectric than that of another other wafer.

The cut away portions of both the top and bottom wafers are preferably identically shaped, so that the wafers are substantially superimposable. In this case the top and bottom wafers are identical, except that they are rotated along one axis such that the top surface on the top wafer 103 is the bottom surface of the bottom wafer 105. The sides of the cut out section of the top and bottom wafers are substantially the same width as the central opening of the central wafer.

Tee fitting 113, made from a moldable material comprising polyvinylidene fluoride (PVDF), sold under the trademark KYNAR®, comprises a flat, elongated sleeve portion 115 defining a void 116, into which a proximal end of the sandwiched ceramic wafers will fit firmly, and a tube fitting portion 117, to draw air into the discharge chamber 129 (shown in dotted lines in FIG. 5) formed by the sandwiched top, spacer and bottom wafers 101, 103 and 105.

The void 119 defined by the tube fitting portion of the tee fitting is continuous with the void 116 and identical void (not shown) created by identical tee fitting 113' described below is shown defined by the flattened, elongated sleeve portion of the fitting.

Another identical tee fitting 113' is used to hold a distal end of the sandwiched ceramic wafers together and to thereby direct ozone from the discharge chamber 129 formed by the sandwiched top, spacer and bottom wafers 101, 103 and 105 to its desired application. The space in the discharge chamber is defined by the substantially central opening 107 in central wafer 101 continuous with the cut away segments 109 and 111 of the top and bottom wafers respectively, and is shown in dotted lines in FIG. 5.

Copper electrode 121' is placed on the outside surface of the top wafer 103 and an identical copper electrode 121 is placed on the outside surface of bottom wafer 105. The electrodes 121 and 121' are connected via wiring 123 and 123' to each pole of a high voltage transformer. The copper electrodes may comprise adhesive-backed copper tape affixed to a side of the Corrosion Resistant Ozone Generator 26 to which copper wire of an appropriate gauge is welded, soldered or otherwise retained, at 127 and 127' on the bottom and top wafers, respectively. The electrodes are preferably placed on a location on the outside surface of the top and bottom wafers that is substantially centrally located with respect to the discharge chamber 129 within the sandwiched wafers 101, 103 and 105.

EXAMPLE 3

Figure 5:
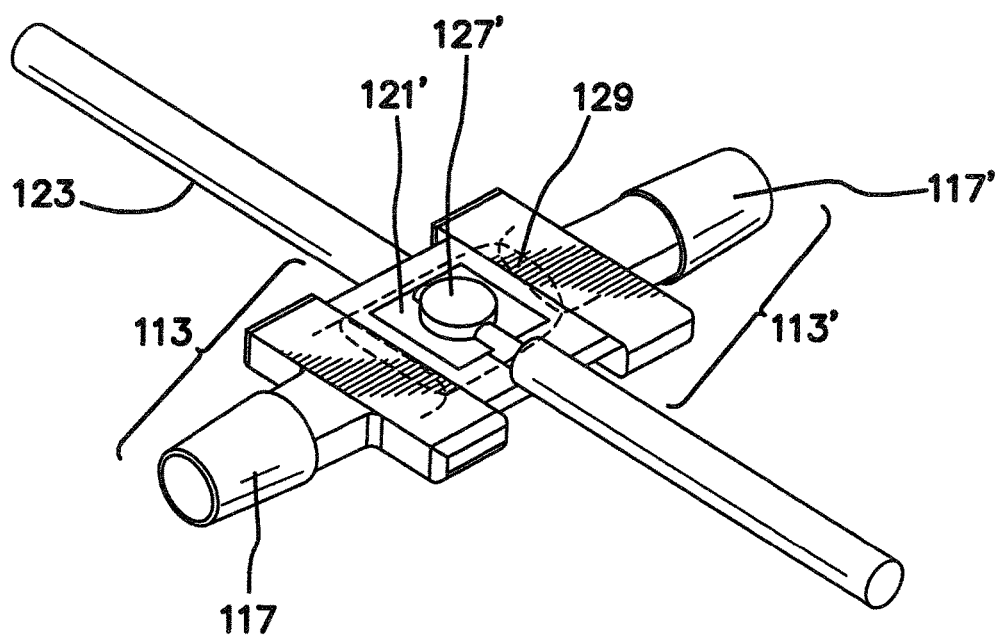
FIG. 5 is a top planar view of the Corrosion Resistant Ozone Generator used in the embodiment shown in FIG. 1.

As shown in FIG. 5, the components shown in FIG. 4 are assembled to form the Corrosion Resistant Ozone Generator 26, as used in the embodiment of the system of the present invention shown in FIG. 1. The Corrosion Resistant Ozone Generator is comprised of the three wafers, namely, a top wafer 103, center wafer 101 and bottom dielectric wafer 105, that are sandwiched together, with conductant metal tape or plates 121 (not shown) and 121' acting as electrodes and wires 123 and 123' (not shown) connecting the plates to each pole of a high voltage source. The conductant plates or tape are located substantially centrally on each of the top surface of the top wafer and the bottom surface of the bottom wafer such that when assembled, they substantially superimpose upon each other and are in addition substantially centrally located with respect to the middle wafer 101 in alignment with to the central opening in the middle wafer, as shown in FIG. 5. These conductant plates are either adhered to the surfaces of the bottom and top wafers or metallized onto the surfaces of the top and bottom wafers. Wires 123 and 123' are soldered, welded or otherwise affixed to these conductant plates or tape to form electrodes. The three wafers are held together in a "bundle" by using the two customized tee fittings 113 and 113'.

In addition, the Corrosion Resistant Ozone Generator 26 is sealed, via either a silicone or other sealant around the tee fitting and ceramic interface to prevent leakage of air and/or ozone containing gases from the electrode assembly.

When a high voltage is applied across electrodes 123 and 123' to form a coronal discharge, oxygen from the air enters the tee fitting 113 through the tube fitting 117 and enters the discharge chamber through the cut out portion 109 of the top wafer 103 and first forms oxygen free radicals, and then the free radicals combine with unreacted O2 to form ozone in the discharge chamber 129, which then exits the ozone generator 26 through the cut out portion of the bottom wafer and the connected tube fitting porting 117' of the distal tee fitting 113'. The inside surface of the walls of the discharge chamber is thus made entirely or substantially entirely from 96% alumina ceramic dielectric. As described in Example 2, the discharge chamber is defined by the substantially central opening 107 in central wafer 101 continuous with the cut away segments 109 and 111 of the top and bottom wafers respectively, and is shown in dotted lines.

EXAMPLE 4

Figure 6:
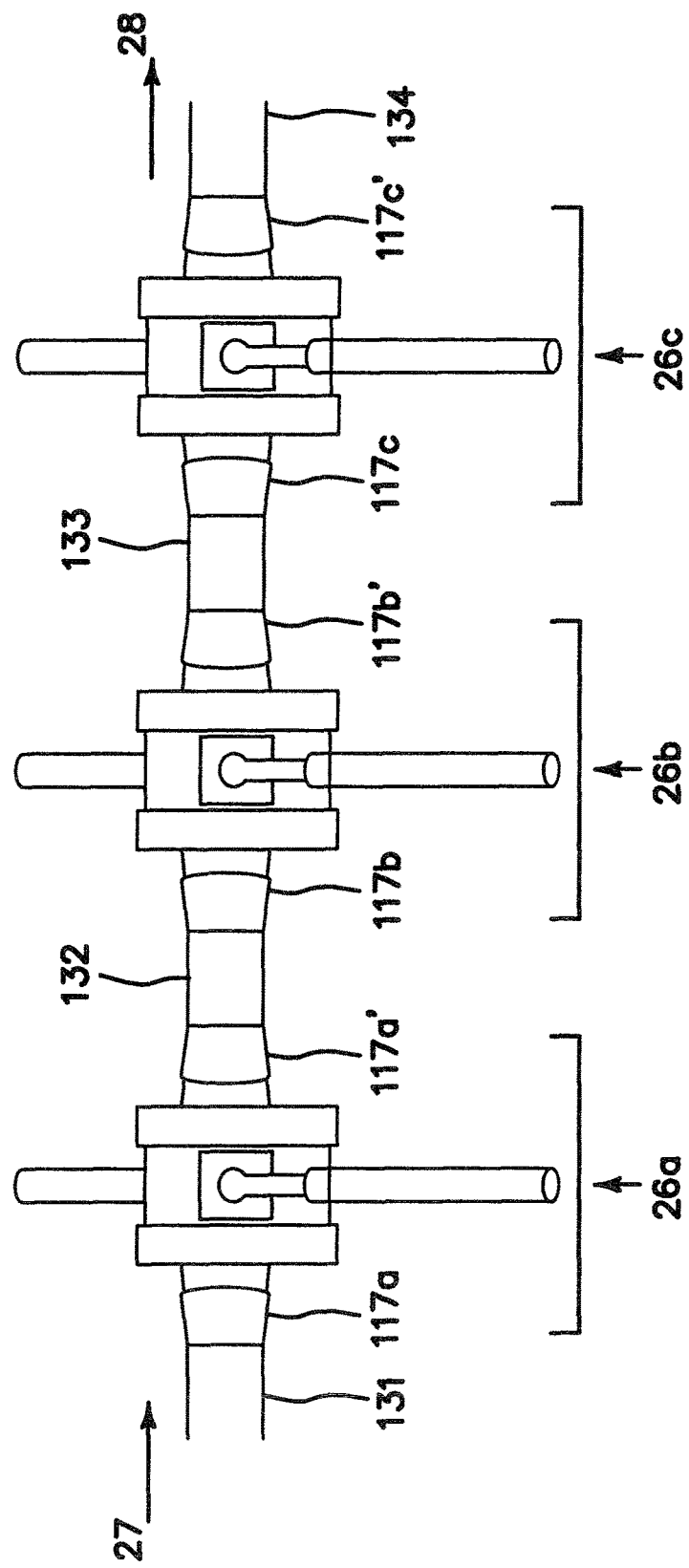
FIG. 6 is a top planar view of an ozone generator of the present invention employing three Corrosion Resistant Ozone Generators in a serial configuration.

As shown in FIG. 6, three chip Corrosion Resistant Ozone Generators 26a, 26b and 26c, whose individual components are described in Examples 2 and 3 and FIG. 3, and are assembled as in FIG. 4, are connected in a serial configuration in order to generate sufficient ozone required to sanitize a pool. An ozone generator comprising such a serial configuration of chip electrodes/ozone cells is used in the embodiment shown in FIG. 1.

In this embodiment, the three Corrosion Resistant Ozone Generators are configured such that the each set of electrodes of each cell are connected to a different voltage source, and are all housed together in a single housing chamber. In the alternative, Corrosion Resistant Ozone Generators may be configured such that all the electrodes of each individual Corrosion Resistant Ozone Generator are connected to a single voltage source. In another variation, each individual Corrosion Resistant Ozone Generator may be housed in different housing chambers. A Corrosion Resistant Ozone Generator comprising such a serial arrangement of three individual ozone generators functions as follows. Air is drawn through air inlet 27 in the housing chamber 16 and enters via tube 131 connected to tube fitting portion 117a of ozone generator 26a. The ozone containing gases produced by ozone generator 26a exit via tube 132 connecting the tube fitting portion 117a' of ozone generator 26a and tube fitting portion 117b of second ozone generator 26b. The oxygen (and ozone)-containing gases entering ozone generator 26b via tube fitting portion 117b get further enriched in ozone and exit via tube 133 connecting the tube fitting portion 117b' of ozone generator 26b and enter third ozone generator 26c via tube 133 connected to tube fitting portion 117c. Gases sufficiently enriched in ozone to sanitize a pool of the desired water volume exit through tube fitting portion 117c' and further through tube 134 and further, housing outlet 28 to the pool water supply. It will be understood by those of ordinary skill in the art that the number of Corrosion Resistant Ozone Generators linked in serial fashion in this way is discretionary according to the amount of ozone desired to be produced, with the only limiting factor being the gradual depletion of oxygen from the air or gas supply introduced at air inlet 27 as a function of an increase in the number of ozone generators linked in series.

EXAMPLE 5

Figure 7:
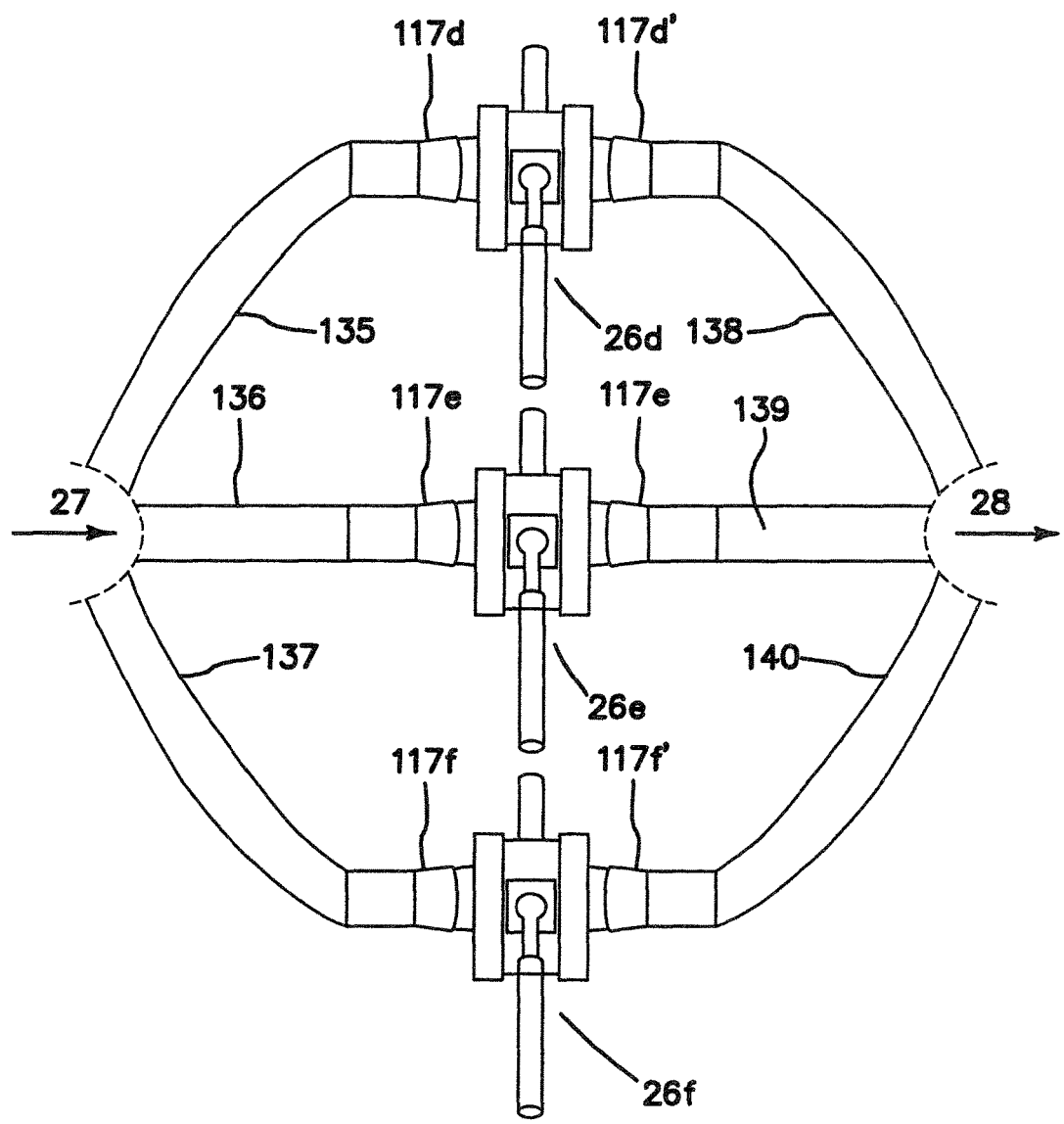
FIG. 7 is a top planar view of an ozone generator of the present invention employing three Corrosion Resistant Ozone Generators in a parallel configuration.

As shown in FIG. 7, three corrosion Resistant Ozone Generators 26d, 26e and 26f, whose individual components are described in Examples 2 and 3 and FIG. 3, and are assembled as in FIG. 4, are connected in a parallel configuration in order to generate sufficient ozone required to sanitize a large Jacuzzi. A Corrosion Resistant Ozone Generator assembly housing 12 comprising such a parallel configuration of individual ozone generators is used in the embodiment shown in FIG. 1.

In this embodiment, the individual Corrosion Resistant Ozone Generators are configured such that both the electrodes of each corrosion Resistant Ozone Generator are connected to a different voltage source, and are all housed together in housing chamber 26. In the alternative, Corrosion Resistant Ozone Generators may be configured such that all the electrodes of each individual Corrosion Resistant Ozone Generator are connected to a sin voltage source. In another variation, each individual Corrosion Resistant Ozone Generator may be housed in different housing chambers. A Corrosion Resistant Ozone Generator comprising such a parallel arrangement of three Corrosion Resistant Ozone Generators functions as follows. Air is drawn from inlet 27 in the housing chamber 16 and enters the system via three tubes 135, 136 and 137 connected to tube fitting portions 117d, 117e and 117f of ozone generators 26d, 26e and 26f, respectively. The ozone containing gases produced by ozone generators 26d, 26e and 26f exit via three tubes 138, 139 and 140 connecting the ozone generators 26d, 26e and 26f respectively, and finally exit the housing chamber at outlet 28. Gases enriched in ozone sufficiently to sanitize a large Jacuzzi are produced at the outlet 28. While these series and parallel arrangements are show, any combination or configuration of series and/or parallel plumbing can be used.

EXAMPLE 6

Figure 8:
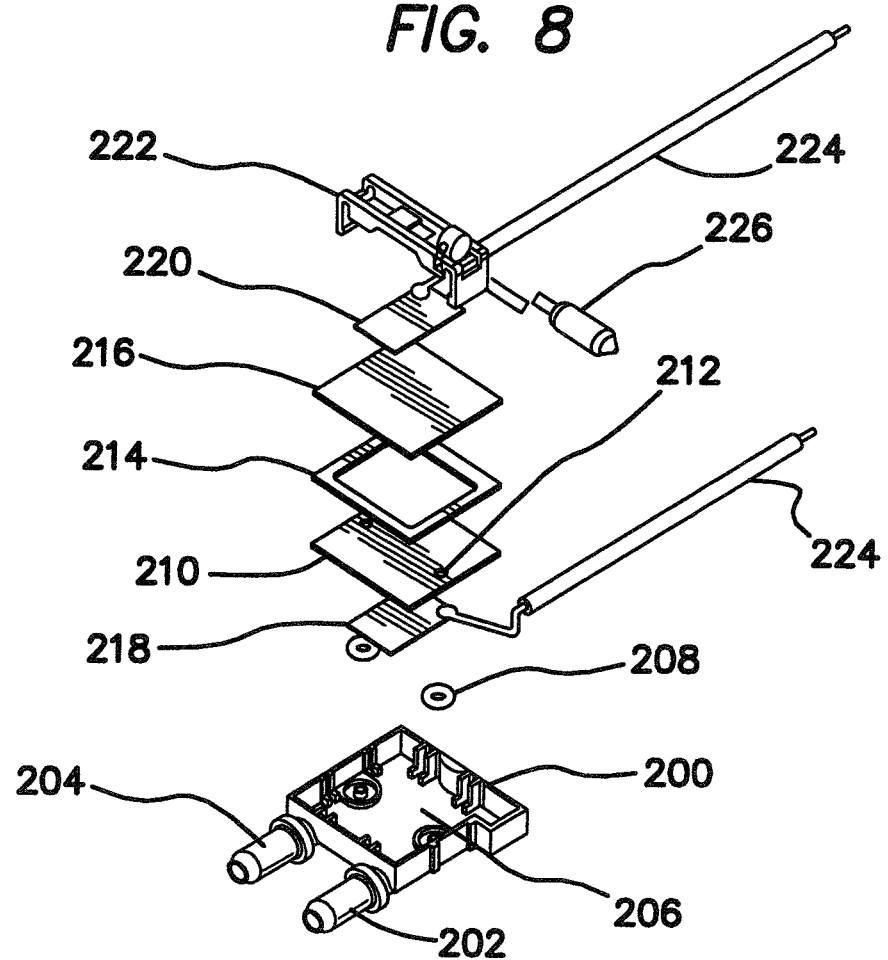
FIG. 8 is a top planar exploded view of the components of an alternative embodiment of the Corrosion Resistant Ozone Generator of the present invention.

As another non-limiting example, FIG. 8 shows an alternative configuration of the ozone generator chip of the present invention. In this embodiment a base component 200, molded from corrosion-resistant material, has both the gas inlet 202 and the ozone outlet 204 built in, and a cavity 206 for the dielectric components. Ozone-resistant o-rings 208 fit into the base component 200 aligned with holes leading into and out of the base. The o-rings seal against the bottom dielectric wafer 210, which has holes 212 at either end to align with the o-rings. The configuration and dimensions of the spacer 214 may be similar to that of the ozone generator chip shown in previous examples. The top dielectric wafer 216 is flat with no flow cuts.

The top and bottom dielectric wafers 210 and 216 and spacer 214, as well as the bottom 218 and top 220 electrodes are sandwiched together as before, with the electrodes and wires 224 on the outer surfaces of the sandwich. A clip 222 forces and holds the assembly together, and the entire cavity is potted with a thermally conductive epoxy material An indicator light 226 is secured to the clip but no electrical connections are made, since the light is illuminated and induced by the electric field of the ozone assembly.

Figure 9:
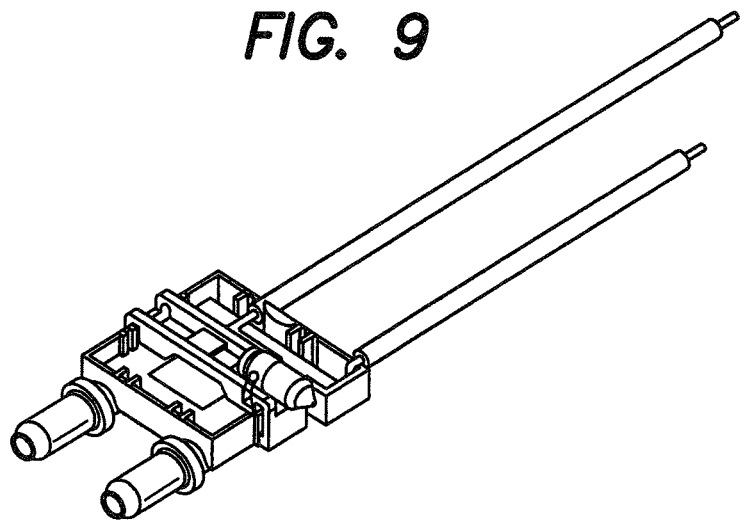
FIG. 9 is a top planar view of the components of the alternative embodiment of the Corrosion Resistant Ozone Generator of the present invention shown in FIG. 8.
Figure 10:
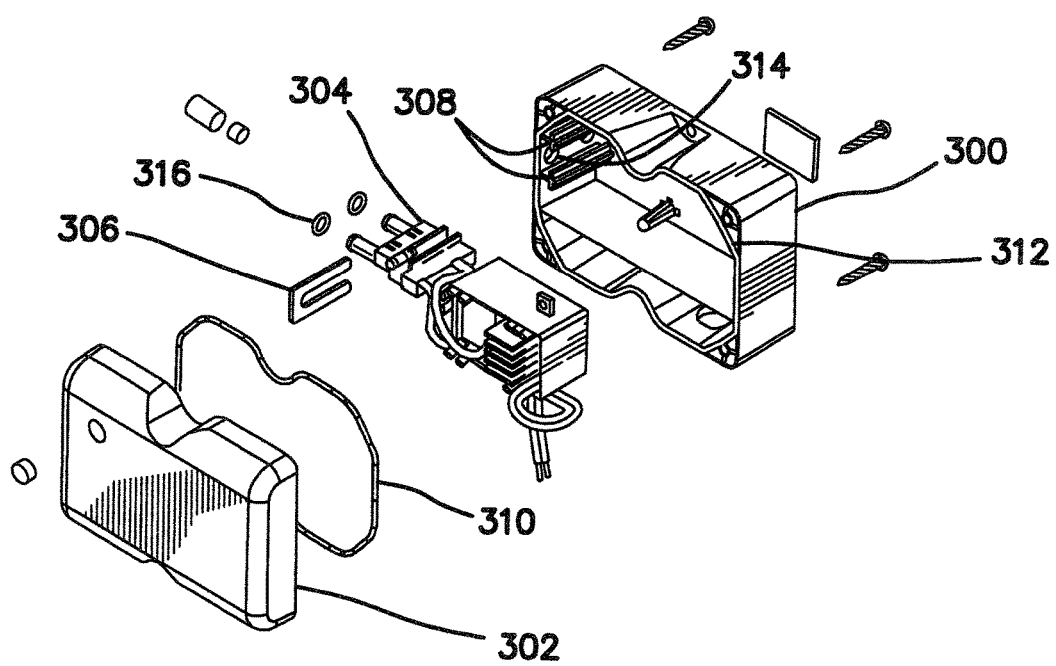
FIG. 10 is an exploded view of a housing for the alternative Corrosion Resistant Ozone Generator shown in FIG. 8 and FIG. 9.

FIG. 9 shows the entire Corrosion Resistant Ozone Generator assembly assembled and clipped together. FIG. 10 shows the Corrosion Resistant Ozone Generator chip assembly of this embodiment installed in a protected, gasket-sealed moisture resistant housing assembly similar in function to that shown in FIG. 1p; in this case the housing body 300 is configured to hold the assembled Corrosion Resistant Ozone Generator 304 by means of a clip 306 which fastens over the Corrosion Resistant Ozone Generator and two raised brackets 308 on the inside surface of the housing body. A gasket fits within a roughly circular, polygonal, or ovoid race 312 on the inside of both housing body 300 and housing cover 302, thereby preventing substantial infiltration of moisture. Holes on the inside of each the housing body and the housing cover 314, sealed using O-rings 316, provide access to the air inlet and ozone outlet of the Corrosion Resistant Ozone Generator. The assembly is screwed together.

Figure 11:
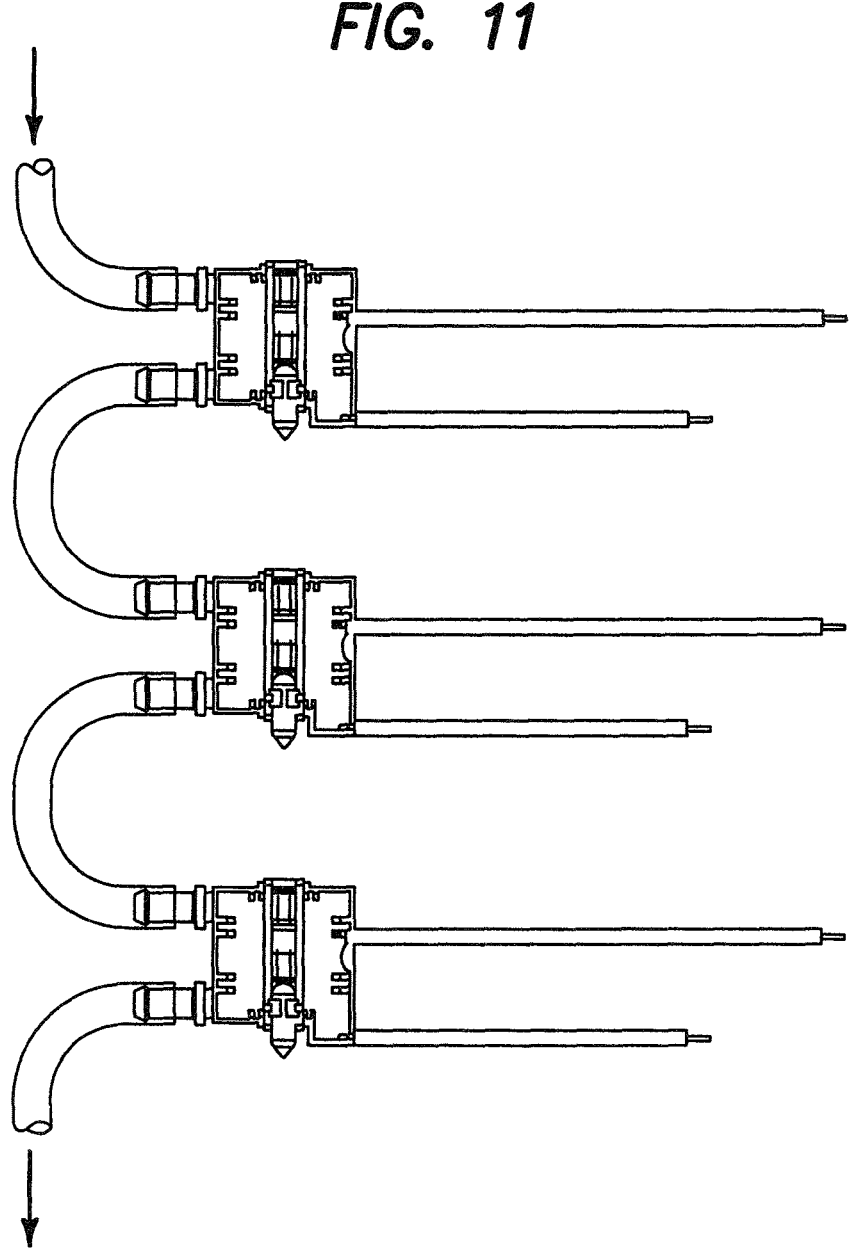
FIG. 11 is an example of a series multi-chip configuration using the Corrosion Resistant Ozone Generator of Example 6.
Figure 12:
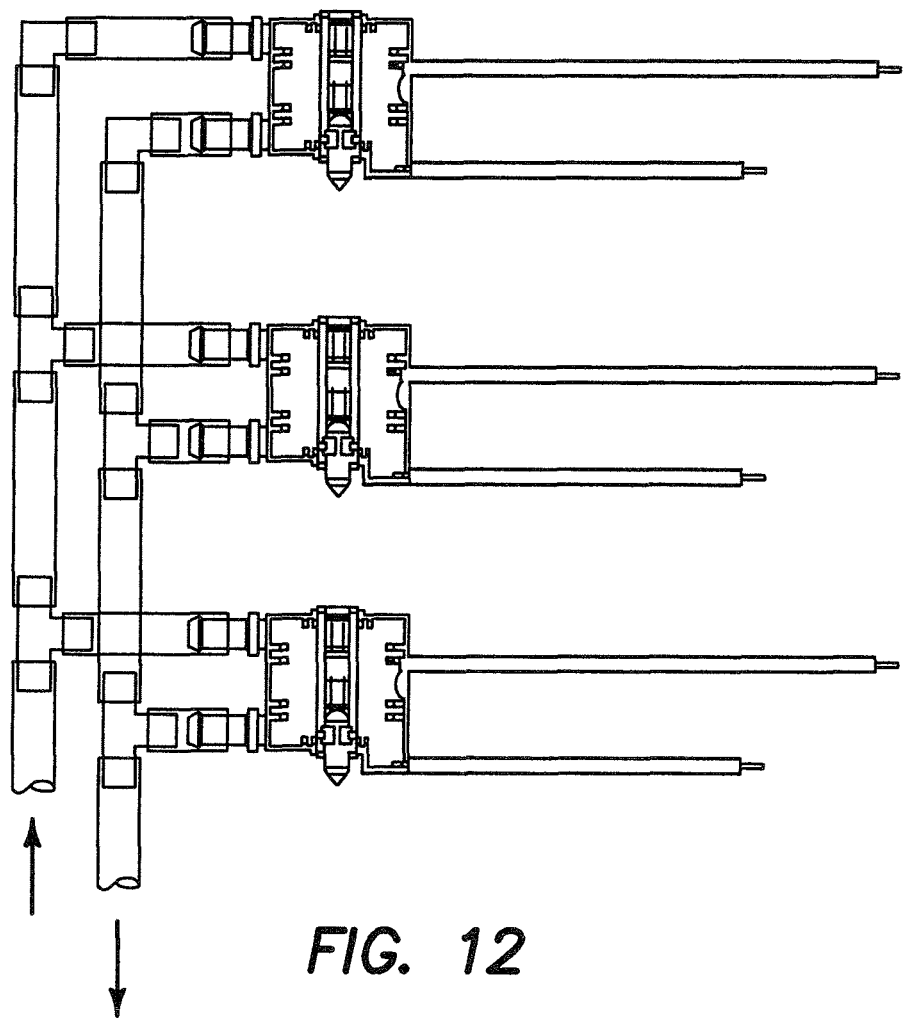
FIG. 12 is an example of a parallel multi-chip configuration using the Corrosion Resistant Ozone Generator of Example 6.

FIG. 11 and FIG. 12 show non-limiting possible parallel and series plumbing configurations, respectively, involving multiple chips of this embodiment of the invention.

While this invention has been described with respect to various specific examples and embodiments, it is to be understood that the invention is not limited thereto and that it can be variously practiced within the scope of the following claims.

What is claimed is:

1. A method of making an ozone generator comprising:
a) manufacturing a plurality of dielectric slabs or wafers having substantially similar overall depth, length and width dimensions, and having a first side and the second side, wherein the length and depth of said slabs is substantially greater than their width;
b) stacking together three of said slabs so that their sides meet; wherein a middle slab comprises a central void completely surrounded by dielectric material, wherein a top slab comprises a first groove or void at a first edge, and wherein a bottom slab comprises a second groove or void at a second edge opposite said first edge thereby creating, when the slabs are stacked, a single discharge chamber comprising a gas inlet and a gas outlet, wherein:
i) said first groove or void of the top slab is coextensive with,
ii) the central void of the middle slab, which is coextensive with,
iii) the second groove or void of the bottom slab, and;
c) placing a first high-voltage electrode on the outside surface of the top slab,
d) placing a second high-voltage electrode on the outside surface of the bottom slab;
e) providing means for directing an oxygen-containing gas through the gas inlet into the discharge chamber, and
f) providing means for directing an ozone-containing gas from the discharge chamber through the gas outlet.

2. The method of making an ozone generator of claim 1, wherein the stacking together three of said slabs additionally comprises providing at least two tee fittings, each respectively comprising a flat, elongate sleeve portion and a tube fitting portion, one in between two stacked slabs and the other in between the other two stacked slabs, wherein the tee fitting is configured to cooperate with the groove or void of the respective stacked slabs, thereby, when the slabs are stacked, sealing the gas inlet and gas outlet, and directing gas into the inlet on one side of the respective stacked slabs, and directing gas from the outlet on the opposite side of the respective stacked slabs, following coronal discharge and the generation of ozone from oxygen.

3. The method of making an ozone generator of claim 2, wherein the stacking together three of said slabs additionally comprises maintaining the bundle of stacked slabs together via the at least two tee fittings, with the proviso that not glue or bonding agent is used.

4. The method of making an ozone generator of claim 2, wherein the tube fitting portion of each of the at least two tee fittings is configured to be barbed or luered.

5. The method of making an ozone generator of claim 2, wherein a void defined by the tube fitting portion of each of the at least two tee fittings is continuous with a void defined by the flat, elongate sleeve portion of each of the at least two tee fittings.

6. The method of making an ozone generator of claim 1, wherein the manufacturing a plurality of dielectric slabs additionally comprises manufacturing the top slab and the bottom slab such that they are identical, such that the bottom slab can be rotated 180° as compared to the top slab before inserting the middle slab between the top and bottom slab.

7. The method of making an ozone generator of claim 1, wherein the manufacturing a plurality of dielectric slabs additionally comprises manufacturing the groove or void of the top and bottom slabs via molds, the molds defining notches corresponding to the groove or void of the respective slab, and manufacturing the middle slab via a second mold comprising a central projection for fabricating the central void of the middle slab.

8. The method of making an ozone generator of claim 1, wherein the manufacturing a plurality of dielectric slabs additionally comprises manufacturing the slabs such that they are identical, and then manufacturing the top slab and the bottom slab via a cutting tool to machine into the respective slab the groove or void characterizing the top and bottom slabs, and the central void characterizing the middle slab.

9. The method of making an ozone generator of claim 1, wherein the placing of a first high-voltage electrode on the outside surface of the top slab, and a second high-voltage electrode on the outside surface of the bottom slab, additionally comprises placing the first high-voltage electrode and the second high-voltage electrode on a flat side of the respective slab, in each case, substantially directly over the location of the discharge chamber.

10. The method of making an ozone generator of claim 9, wherein the placing of a first high-voltage electrode on the outside surface of the top slab, and a second high-voltage electrode on the outside surface of the bottom slab, additionally comprises placing the first high-voltage electrode and the second high-voltage electrod in a generally centrally located position with respect to the outline of the discharge chamber underneath.

11. The method of making an ozone generator of claim 1, additionally comprising repeating act a) through f) with at least a second set of slabs, and teaming together the first set of slabs with the at least second set of slabs, when assembled, in a serial or parallel, or a combination of serial and parallel, configuration to provide enhanced ozone production.

12. The method of making an ozone generator of claim 2, wherein the placing of a first high-voltage electrode on the outside surface of the top slab, and a second high-voltage electrode on the outside surface of the bottom slab, additionally comprises placing the first high-voltage electrode and the second high-voltage electrode on a flat side of the respective slab, in each case, substantially directly over the location of the discharge chamber.

13. The method of making an ozone generator of claim 12, wherein the placing of a first high-voltage electrode on the outside surface of the top slab, and a second high-voltage electrode on the outside surface of the bottom slab, additionally comprises placing the first high-voltage electrode and the second high-voltage electrod in a generally centrally located position with respect to the outline of the discharge chamber underneath.

14. The method of making an ozone generator of claim 2, additionally comprising repeating act a) through f) with at least a second set of slabs, and teaming together the first set of slabs with the at least second set of slabs, when assembled, in a serial or parallel, or a combination of serial and parallel, configuration to provide enhanced ozone production.

* * * * *